Dec. 19, 1944.  L. L. BOSCH  2,365,514
ALTERNATING CURRENT NETWORK
Filed March 3, 1942
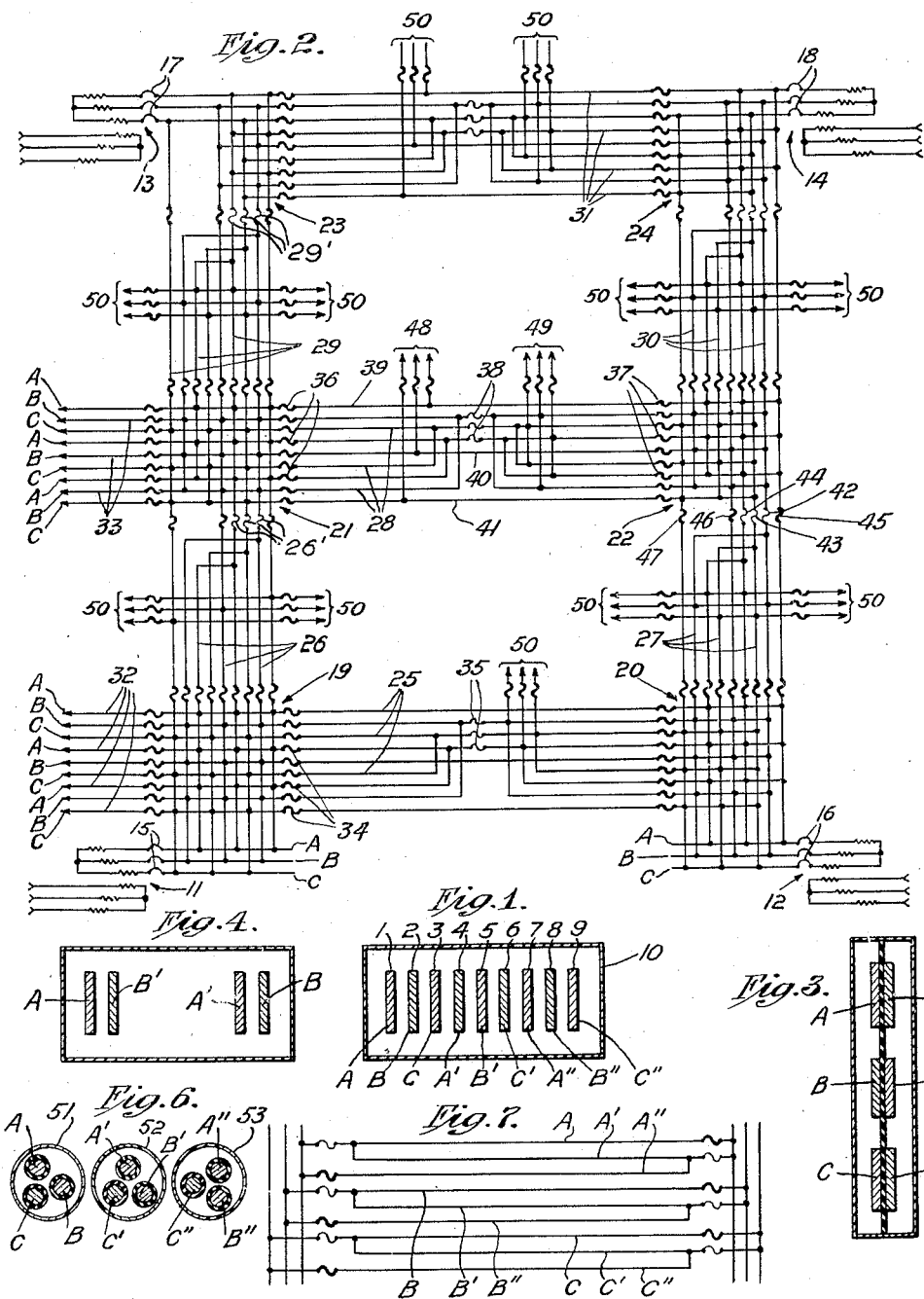
INVENTOR
Lester L. Bosch
BY
ATTORNEY Patented Dec. 19, 1944

2,365,514

UNITED STATES PATENT OFFICE 2,365,514

ALTERNATING CURRENT NETWORK

Lester L. Bosch, Cincinnati, Ohio, assignor to The Trumbull Electric Manufacturing Company, Plainville, Conn., a corporation of Connecticut Application March 3, 1942, Serial No. 433,201

6 Claims. (Cl. 175—294)

This invention relates to networks used for the distribution of electrical energy and especially to industrial networks for the distribution of alternating current.

More particularly this invention pertains to a system for protecting industrial A. C. networks from shutdowns or damages due to short circuits or heavy overload faults of a similar nature. My invention provides a network distribution system incorporating therein automatically operating devices which will change the impedance of certain interconnecting ties used in such network, so as to delay or avoid the complete opening up of portions of the network in such fashion as to render them dead and thereby interfering with the operation of the system as a whole.

As the load requirement of an industrial plant grows beyond the capacity of a simple radial distribution layout, the special characteristics of the A. C. network often offer significant advantages over other methods of low voltage distribution. This is true particularly where the load density is high, the plant large, and where a number of well placed transformer bank locations can be secured. In instances where the load densities within the plant shift from season to season or with the product manufactured further advantages may be gained.

The growing use in industry of a low voltage alternating current system supplied from a plurality of locations about a plant has presented the need for a simple and inexpensive means of interconnecting such sources of supply without losing the many inherent advantages of the network type of service. In this connection it is to be borne in mind that the industrial network usually differs from the conventional utility network in that on the average both the transformer banks and the interconnecting ties are of higher capacity making higher short circuit currents likely, while fire hazards preclude the practice followed by many utilities of burning clear secondary short circuits. Other means must then be used to clear these faults and prevent the electrical loss of the primary sources of supply in the event of a severe secondary fault.

From the viewpoint of voltage regulation and efficiency it is required that the tie circuits of such a network be of low impedance. On the other hand the maximum short circuit current would be reduced if the impedance of the tie circuits were high. In general this invention provides means for interconnecting two or more alternating current sources of supply in such a manner that under normal operating conditions the impedance of the interconnection is low, but that in case of a short circuit or similar fault condition the impedance will become comparatively high. For instance if an interconnection joins two sources of supply, then under normal operation the two sources would carry the load in parallel with the attendant advantages of high efficiency and good voltage regulation. The connection would provide a high degree of reliability since the loss of one source of supply would still leave the connection energized and capable of carrying a load limited only by the capacity of the remaining source. Under short circuit or fault conditions however, the device of my invention will change the characteristics of the interconnection from that of low impedance to one of relatively high impedance and thereby will substantially limit the fault current transmitted over such interconnection, which often will permit the easy clearance of the fault or short circuit.

As one example of such employment of my invention, if a short circuit should occur at the low tension side of one of the power sources such as transformer banks feeding the load, then the other power source or transformer bank would be prevented by the change to high impedance brought about by my invention, from transmitting a dangerously heavy current over the interconnection tie. The fault condition would be localized and would not unduly disturb service remote from the short circuit. Of significant importance is the fact that the primary supply of the transformer not subject to short circuit fault would not be called upon to supply an excessive current. These two transformer bank sources of supply might be located within an industrial plant, outside the plant, or again they might be located so as to supply a block of diversified loads.

The effect of my invention in causing this transition from a tie of low impedance, to one of high impedance will be substantially the same, whether the tie be a single interconnection between two transformer banks, a multiple tie connection between two transformer banks, or interconnections between a multiple assembly of transformer banks. It will be substantially the same whether the transformer banks be supplied from a common high voltage circuit or from independent circuits. In fact, my invention is likewise applicable to the interconnection of alternating current generators and the like as well as to the interconnection of transformer banks.

To carry out my invention I provide a tie connection between two or more alternating current sources of the nature just described and equip this tie connection with protective devices so designed that in the event of the initiation of an excessive current transmission over the interconnection, such protective devices will operate and convert the interconnection of relatively low impedance into an interconnection of substantially higher impedance, while not opening the tie connection circuit completely, unless the fault is heavy and persistent.

One object of my invention is to provide an electrical distributing system having a great degree of reliability, especially under conditions where a short circuit or similar fault of a temporary or light nature occurs in some particular portion of the system.

Another object of my invention is to provide an electrical distributing network including devices for minimizing the effects of short circuit faults by changing the impedance of tie portions of such network.

Another object of my invention is to provide an electrical distribution network incorporating therein protective devices having differing speeds of response to short circuit faults, so as to clear such faults in a speedy fashion and without disruption of other portions of the network, free from faults.

Yet another object of this invention is to provide in an industrial A. C. network, protective devices of varying speed response characteristics, interconnected in such fashion that the operation of a protective device having a relatively high speed of response will reduce a fault current which tends to operate a protective device having a relatively lower speed of response.

Yet another object of my invention is to provide a polyphase distribution system using a number of parallel connected and interleaved conductors, together with means for opening the circuit through certain conductors so as to increase the impedance of the system as a whole substantially more than the effect of the loss of the parallel paths.

Still another purpose is to provide a polyphase distribution system having high speed protective devices in series with certain conductors and lower speed protective devices in series with other parallel connected conductors so that the operation of the high speed protective devices will effectuate a series connection of the conductors in the system.

Still another object of my invention is to provide industrial A. C. networks wherein the impedance of tie circuits is automatically increased upon the occurrence of short circuit faults, so as to reduce the interconnection currents flowing through such tie circuits.

The principles and some applications of my invention will be more apparent from the drawing hereunto annexed, where:

Fig. 1 shows in cross section a 3-phase, 9-conductor flat face-to-face bus bar assembly.

Fig. 2 is a schematic diagram of a 3-phase 9-conductor circuit alternating current low voltage industrial network supplied from four transformer banks and showing protective devices connected therewith according to my invention.

Fig. 3 shows a cross section of a 3-phase 6-conductor bus bar assembly of edgewise and flatwise configuration.

Fig. 4 shows a cross section of a single phase 4-conductor flat face-to-face bus bar assembly.

Fig. 5 shows a cross section of a single phase 4-conductor assembly of round conductors.

Fig. 6 shows in cross section three conduits each containing a 3-wire, 3-phase circuit.

Fig. 7 is a schematic diagram showing the connection between the supply and receiving end of the three circuits shown in Fig. 6, and illustrating protective devices connected therewith according to my invention.

Two possible methods of accomplishing the desired results by the use of my invention are shown in the drawing. One includes a special connection for bus bars when arranged in close spacing. The other includes a parallel-series arrangement applicable particularly to cables.

The method of operation of the bus bar arrangement is illustrated in Fig. 1 which shows as an example nine flat bus bar conductors, 1, 2, 3, 4, 5, 6, 7, 8 and 9, suitably insulated and arranged in a flat face-to-face bar configuration with phase arrangement of A, B, C; A', B', C'; A'', B'', C''; where A, B and C denote the three respective conductors of a complete 3-phase circuit, and housed within a suitable enclosure 10. Under normal conditions the respective phases are intended to be connected in parallel at both sending and receiving ends, thus making a network circuit of three circuits in parallel with the bars in relatively close spacings and interleaved, giving a transmission line of both low resistance and low reactance.

As will be shown later, in the event of the occurrence of a short circuit fault, protective devices will open circuit conductors 2, 3, 4, 6, 7 and 8, leaving in service a single three phase circuit consisting of conductors 1, 5, and 9, arranged in an effective spacing of four times the original spacing and without interleaving. This remaining circuit will have an impedance greatly in excess of the original circuit because of at least two factors; first, the remaining circuit will be a single circuit instead of being composed of three individual circuits connected in parallel with one another; second, the impedance of the remaining circuit will be considerably greater than the impedance of any one of the three original circuits, because the bars now will be effectively spaced at four times the center-to-center distance in the original state, giving a considerably higher reactance and even a higher A. C. resistance, since proximity effect will be less effective in neutralizing skin effect. Methods of calculation known in the art show that a combined reactance change of approximately 1 to 7 is to be expected when this change takes place in a system composed of flat bars in such close spacings as are now available in certain commercial designs, and by the use of specially spaced grouping an even higher reactance change can be obtained.

The interconnected circuit shown in Fig. 2 is supplied by four 3-phase transformer banks 11, 12, 13 and 14. For simplicity of drawing, each of these transformer banks is shown Y—Y connected, instead of the more usual delta-Y or delta-delta connection. Circuit breakers, fuse or conventional network protectors 15, 16, 17 and 18 on the low tension sides, convey power from the respective transformer banks to the common grid or network. This particular network consists of six junction points 19, 20, 21, 22, 23 and 24 and seven interconnection tie circuits 25, 26, 27, 28, 29, 30 and 31. Numerous load tap-offs and two main bus extensions 32 and 33 are shown. For simplicity, fuses have been shown as the special protective devices used according to my invention, but it is evident that any suitable type of protective device may be employed. In fact reclosing protective devices may be used if so desired. Two types of fuses have been shown, the "time lag" type shown at 34 and the "high speed" type shown at 35. The time lag fuses are located and designed for protection against sustained over-loads and short circuits which persist beyond a reasonable time interval. The high-speed fuses are for protection against the passage of excess short-circuit currents in the seven interconnecting circuits. Both types of fuses are assumed to have such normal inverse time characteristics as will permit of selective clearing action.

The method of operation of my invention may be illustrated by assuming a three-phase bus short-circuit to occur at junction 22. Immediately following such a short circuit heavy currents will start to flow from all four transformer banks and unless the tie circuit protective devices operate at high speed the primary supply to each of the transformers will be put into jeopardy, due to the operation of the conventional primary supply protective devices (not shown) or by operation of main low side protective devices as shown at 15, 16, 17 and 18. A certain portion of the short circuit current will pass over tie circuit 28, another portion over tie circuit 27 and the remainder over tie circuit 30. Circuit 28, it will be noted, has two sets of "time lag" fuses 36 and 37 and three high speed fuses 38. The "time lag" fuses protect each wire against excessive sustained currents while the three high speed fuses are connected so as to change tie circuit 28 from a low impedance to a relatively higher impedance circuit by their opening of the circuits through six conductors thereof, as explained in connection with Fig. 1.

In the short circuit under consideration the three high speed fuses 38 will quickly operate to make circuit 28 effectively of higher impedance. They will operate before the operation of the high speed fuses 26' and 29' in circuits 26 and 29, because these two circuits supply circuit 28 in parallel, and therefore their fuses divide the total current between them. After the operation of the high speed fuses in circuit 28 only three conductors 39, 40 and 41 remain in actual service to form the tie. As previously described, this will be a higher impedance circuit and this change will very materially reduce the short circuit current transmitted over circuit 28. After this action it can be seen that if a sufficiently heavy short circuit still exists, the time lag fuses of conductors 39, 40 and 41 of circuit 28 will carry the full short circuit currents supplied over both circuits 26 and 29. Since these two latter circuits will still be intact, each wire of circuit 28 will carry the sum of the short circuit currents in six wires of circuits 26 and 29. The action that will follow is that the time lag fuses in circuit 28 will quickly blow if the short circuit current be great enough.

While the action just described is taking place in circuit 28, similar action is in progress in both circuits 27 and 30. In circuit 27, for instance, the initial fault will blow the high speed fuses 42, 43 and 44 before the higher capacity devices 16 have time to operate. Time lag fuses 45, 46 and 47 will then pass the entire current of circuit 27. Their comparatively low rating will cause them to operate quickly and isolate the fault from circuit 27. In like manner the fault would be isolated from circuit 30.

Other possible short-circuits will be handled in a similar manner. It is to be noted that in each case the set of high speed fuses are chosen so as to be capable of carrying sustained normal over-loads but so as to operate quickly in the event of a short circuit. This action of opening six of the nine conductors converts the circuit into a path of high impedance, protects the primary supply and reduces the current to be handled by the time lag device in the remaining skeleton circuit. Loads may be tapped off any tie circuit as shown providing that a parallel path is not completed between a conductor protected by a high speed fuse with a conductor not so protected. Taps 48 and 49 show examples of permissible tapping practice on circuit 28, and at 50, 50, 50 are shown other circuits tapped from other tie circuits.

It will be apparent to those skilled in the art that high speed type circuit breakers may be substituted for the high speed fuses in the tie circuit. These circuit breakers may be of the automatic reclosing or remote reclosing type so as to insure a speedy re-establishment of service after the fault has been cleared. Circuit breakers operating on the rate of current rise principle may be used to insure a speedy selective action. Tie circuits 28 and 30 differ in details of conductor arrangement but both operate in similar fashion when a short circuit occurs.

Other network circuits may, of course, be used or other circuit combinations may be employed. Fig. 3 shows an example of a two parallel circuit bus bar assembly arranged on a flat-wise and edge-wise configuration. Under normal operation both circuits would be connected in parallel to form a low impedance interconnection tie circuit. Under fault conditions one of the circuits would clear leaving in service the remaining circuit arranged on an edgewise high impedance configuration. The ratio of the low impedance to the high impedance may likewise be predetermined within certain limits, depending on the closeness of the flat spacing and the remoteness of the edgewise spacing of the various bus bars.

Another application of my invention is shown in Fig. 4 where two parallel single phase circuits are shown. Normally both circuits will be operated in parallel but in the event of a short circuit, high speed protective devices connected in circuit A', B' in the same fashion as in the case of the circuits of Fig. 2 will open this circuit A', B' thus leaving circuit A, B, having very wide spacing in service. My invention may similarly be applied to round conductors 54, 55, 56 and 57, as shown in Fig. 5. From the examples shown it will be apparent to those skilled in the art that my invention may be employed to effect the desired results on the numerous types and styles of bus arrangements and configurations in use today, by suitable variations of connection.

Fig. 6 and Fig. 7 show another method by which the desired results arising from the use of my invention may be obtained with an interconnected tie consisting of sets of parallel cable, with each set located in a separate conduit. The three conduits 51, 52 and 53 each contain a complete three-phase circuit of conduits ABC, A'B'C' or A"B"C". Under normal operating conditions the three sets of cables are connected in parallel as shown in Fig. 7. Under short circuit conditions the high speed fuses will quickly operate and convert the circuit from a parallel to a series arrangement. Circuit A, A' and A" will be connected in series, as also will be B, B', B" and C, C', C". The impedance of the path will then be nine times that of the parallel arrangement. If the fault current still persists, the time lag fuses will then operate, completely open-circuiting the interconnection tie line, in the manner previously described in connection with Figure 2.

One advantage of my invention is that very significant reduction in short circuit current can be accomplished by using tie circuits of this automatically changeable low-high impedance characteristic. The attendant economic advantages of lower short circuit currents as well as the improved reliability of networks by not jeopardizing the primary supply are factors of considerable importance.

Other advantages of my invention are that its use will provide a network with very good normal voltage regulation, high efficiency, high degree of reliability, an ability to absorb and shift loads, as well as protection against short circuits. The good inherent voltage regulation of these low impedance network ties may frequently make possible and economic the supply of lighting loads from an otherwise purely power network.

Furthermore by the use of my invention, in the majority of cases short circuits will be cleared without the loss of service by the highly selective action of the protective time lag devices in combination with the variable impedance of the tie circuits.

The interconnection system of my invention may advantageously be used to interconnect transformer banks in a low voltage alternating current network system of the utility type. Certain features of my invention may be useful for the regulation of a delivered voltage by reducing voltage drops due to abnormally heavy interconnection currents caused by faults.

Other advantages and uses of my system will be apparent to those skilled in the art and it will be apparent that many different embodiments thereof are possible, according to the use thereof with distribution systems having varying characteristics and employing alternating current of various types.

I claim:

1. A system for changing the impedance of a tie line in an electrical network supplied by a plurality of sources of current, including means for normally passing current over a plurality of busses lying closely adjacent each other and connected in interleaved multiple fashion and means automatically responsive to overload current flow for breaking the multiple connections between busses and confining the current flow to a lesser number of conductors, whereby the impedance of said tie line is increased.

2. A polyphase network including a plurality of connected sources of alternating current, a line having certain busses connected in parallel in lieu of a single bus and placed closely adjacent other bus bars of said line and including overload circuit breakers of relatively high-speed inserted in series with all but one of said parallel connected busses, whereby the opening of said circuit-breakers will leave one bus carrying the entire current flow of any one phase, so as to constitute a line of substantially higher impedance.

3. In an enclosed bus bar A. C. distribution system, a plurality of sources of current having conductors connected in parallel and normally subdividing the total current flowing through said system, said conductors being interleaved in such fashion that conductors connected in parallel are spaced from one another by at least one other conductor, whereby the impedance of the system is lessened, and means for automatically disconnecting some of said parallel connected conductors so as to increase the impedance of the remainder of the system.

4. An A. C. distribution network including a plurality of sources of current having conductors lying adjacent one another, each circuit under normal operating conditions including at least two parallel connected conductors, a relatively high speed fuse device in series with at least one but not all of said parallel connected conductors and a relatively slow speed fuse device in series with at least one of said parallel connected conductors other than a conductor having in circuit therewith a high speed fuse, whereby a network fault causing excessive current flow will cause the rupture of said high speed fuse device and open the circuit through some of the conductors and consequent increase of over-all impedance, and whereby continued excessive current flow thereafter will cause the rupture of said slow speed fuse device.

5. A distribution network comprising a plurality of sources of current having three circuits in parallel with multiple bus bars in relatively close spacing and interleaved and having low resistance and low reactance, high speed protective devices in some of the bus bar circuits for opening the said latter circuits and leaving those bus bars in circuit which are most remotely spaced and time lag protective devices in the circuits of said remaining bus bars.

6. A polyphase distribution network having a plurality of sources of current having parallel conductors with time lag protective devices in circuit with each conductor and other parallel conductors interleaved with the first mentioned conductors and having high speed protective devices in circuit with such other conductors.

LESTER L. BOSCH.